Aug. 30, 1966     B. DI MARCO ETAL     3,270,303
HOLD-DOWN MEANS FOR CONTACTOR MAGNET COIL
Filed Nov. 23, 1964     2 Sheets-Sheet 1
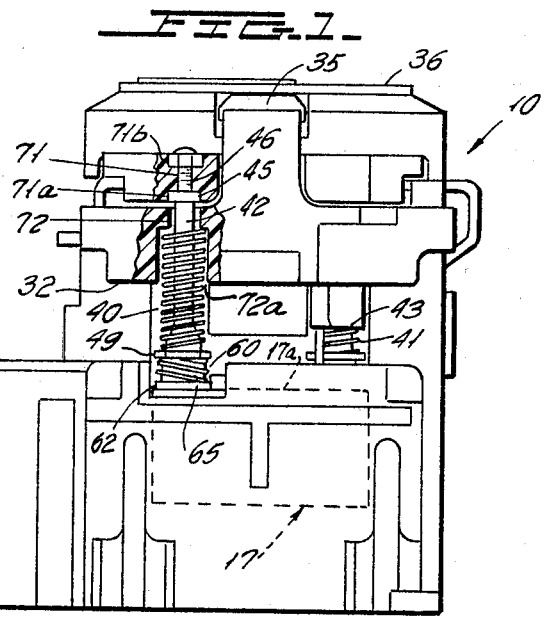
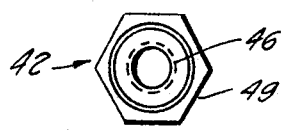
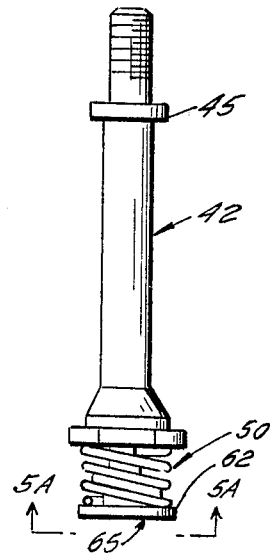
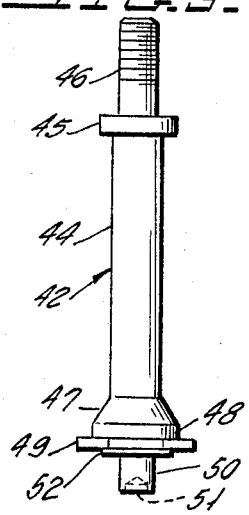
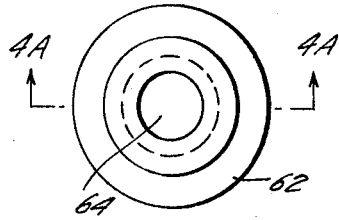
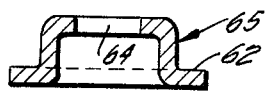
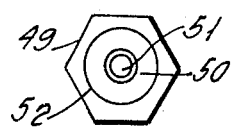
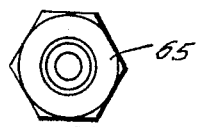
INVENTORS
BERNARD DI MARCO
ROBERT W. THOMAS
BY
OSTROLENK, FABER, GERB & SOFFEN
ATTORNEYS

United States Patent Office 3,270,303
Patented August 30, 1966

3,270,303
HOLD-DOWN MEANS FOR CONTACTOR MAGNET COIL
Bernard Di Marco, Lincoln Park, and Robert W. Thomas, St. Clair Shores, Mich., assignors to I-T-E Circuit Breaker Company, Philadelphia, Pa., a corporation of Pennsylvania
Filed Nov. 23, 1964, Ser. No. 412,984
8 Claims. (Cl. 335—202)

This invention relates to electro-magnetic contactors in general and more particularly relates to a novel means for positioning the coil of the electro-magnet.

The Cataldo et al. copending application 189,915, filed April 24, 1962, entitled, Electrical Devices, and assigned to the assignee of the instant invention, discloses an electro-magnetic contactor in which there is a readily removable magnet operating coil maintained in position by formations in a molded base in cooperation with an abutting portion of a removable contact sub-assembly. More particularly, this abutting portion is the ends of the studs for mounting the return springs which operate the contactor to open circuit position after the operating coil is deenergized. The coil of the device in the aforesaid copending application 189,915 is provided with a pair of contacts which frictionally engage spring fingers in the molded base. These fingers are extensions of terminal points mounted to the base for making connections to external circuitry.

It has been found that because of dimensional tolerances the shock forces accompanying operation of the contactor cause relative movement or wiping between the coil contacts and the contacts in the base. This relative movement often caused excessive contact wear prior to the expiration of expected contactor life.

In order to correct this condition it was proposed to firmly seat the coil against the molded base by utilizing the return springs as a biasing means. However, this arrangement proved to be unsatisfactory since in the open position of the contactor the return springs are very lightly loaded. An attempt to correct this condition by increasing the loading on the return springs proved to be unsatisfactory since an excessive load was then placed on the electro-magnet which prevented the contactor from pulling in, or closing, under marginal under-voltage conditions.

The instant invention solves the problem noted above by providing a separate hold-down spring means in addition to the return springs. The stud which mounts a return spring is modified to also mount a hold-down spring and a cup shaped retainer for the hold-down spring. When the removable contact assembly is secured to the molded base the studs are spaced from the operating coil but the retainers are forced against the coil by the hold-down springs. The latter are designed to exert a sufficient force against the coil to prevent objectionable relative movement between the coil contacts and their cooperating contacts in the base. The mounting of the springs to each stud is such that the loading of either or both will not affect the loading of the other.

Accordingly, a primary object of the instant invention is to provide an improved construction for an electro-magnetic contact.

Another object is to provide a novel hold-down means for the coil of an electro-magnet contactor.

Still another object is to provide a contactor in which a return spring and a hold-down spring are mounted to a single stud in a manner such that loading of one will have no effect upon loading of the other.

These as well as other objects of this invention will become readily apparent after reading the following description of the accompanying drawings in which:

FIGURE 1 is a side elevation, with the molding partially broken away, of a contactor constructed in accordance with the teachings of the instant invention.

FIGURE 3 is a side elevation of a stud for mounting a return spring and a hold-down spring.

FIGURES 3A and 3B are views of opposite ends of the stud of FIGURE 3.

FIGURE 4 is a plan view of a hold-down spring retainer.

FIGURE 4A is a cross-section taken through line 4A—4A of FIGURE 4 looking in the direction of arrows 4A—4A.

FIGURE 5 is a side elevation of a return spring stud sub-assembly.

FIGURE 5A is an end view of the sub-assembly of FIGURE 5 looking in the direction of arrows 5A—5A of FIGURE 5.

Figure 2:
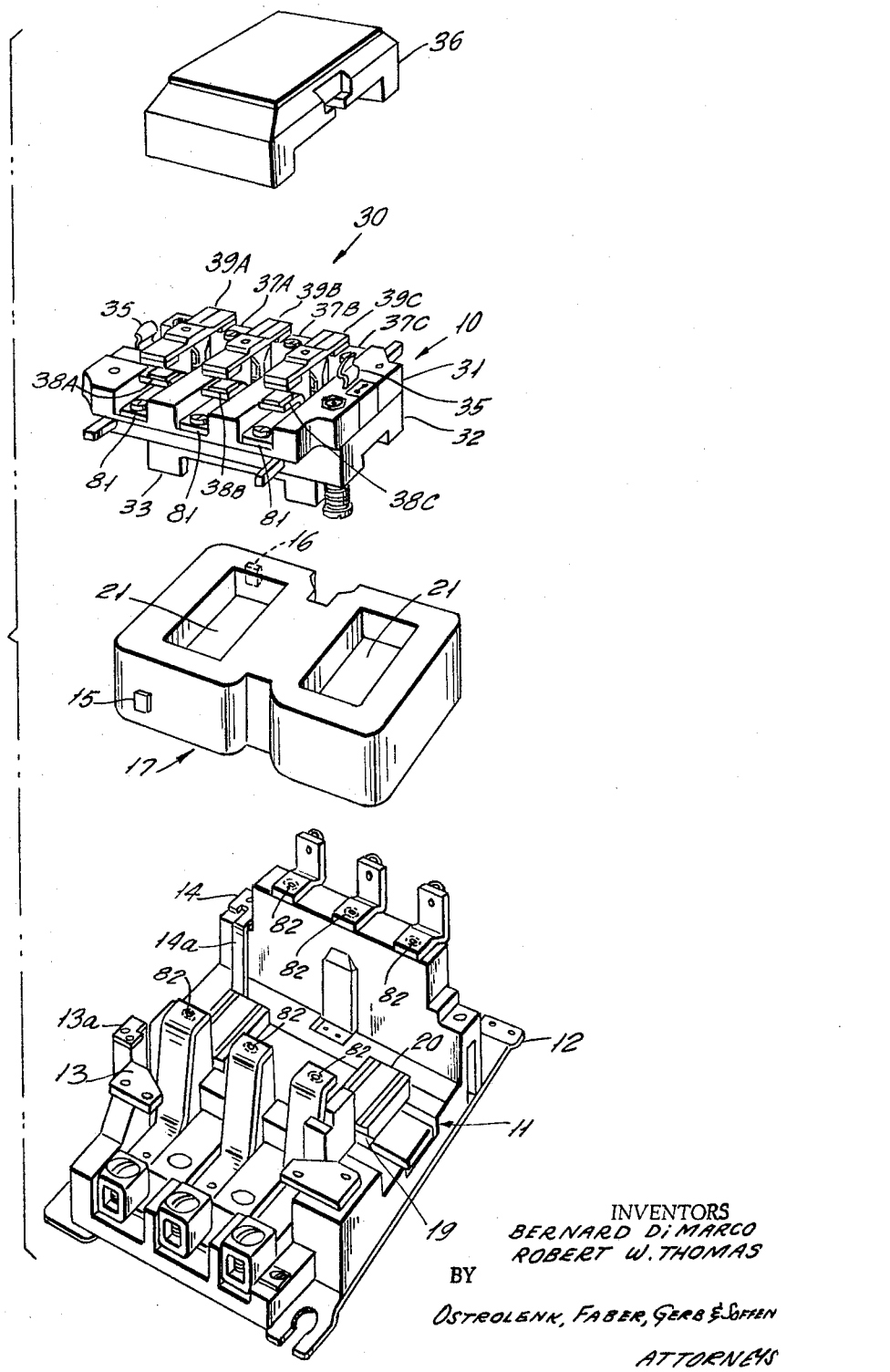
FIGURE 2 is an exploded perspective of the contactor of FIGURE 1.

Now referring to the figures. Contactor 10 is provided with molded base 11 secured to metal mounting plate 12. Base 11 is provided with suitable formations for positioning a plurality of conducting terminal straps and receiving fastening means for these straps as described in detail in the aforesaid copending application 189,915. Of particular interest in connection with the instant invention are terminal straps 13, 14 having flexible extensions 13a, 14a respectively, for engagement with contacts 15, 16 of operating coil assembly 17.

Coil assembly 17 is disposed within base cavity 19 which, as shown in FIGURE 2, is provided with an open top for the ready removal of coil assembly 17. Also disposed within cavity 19 is magnet yoke 20 which is of general U-shape. The arms of yoke 20 extend through windows 21 of coil assembly 17 so that an individual coil of assembly 17 surrounds an individual one of the arms of yoke 20. Mounted above coil assembly 17 is removable contact sub-assembly 30.

The latter includes stationary contact plate 31 and movable contact plate 32 disposed below plate 31. Secured to the bottom of plate 32 is inverted U-shaped magnet armature 33. The free ends of the arms of armature 33 confront the free ends of the arms of yoke 20. Return springs 40, 41 bias movable contact plate 32 upwardly with respect to FIGURE 1 to separate the movable bridging contact members 39A, 39B, 39C away from their cooperating stationary contacts 37A, 37B, 37C, 38A, 38B, 38C mounted to plate 31. Insulating cover 36, held in place by clips 35, encloses the movable and stationary contacts.

Return springs 40, 41 are mounted to studs 42, 43, respectively, positioned at diagonally opposite corners of coil assembly 17. Since studs 42, 43 are identical, have identical members mounted thereto and are themselves mounted in essentially the same manner, only stud 42, its mounting and the elements mounted thereto will be described in detail.

As seen in FIGURE 3, stud 42 is an elongated member having an extensive mid-portion 44 of circular cross section. One end of section 44 terminates in outward shoulder 45 and axial extension 46 having external threads at the free end thereof. The other end of section 44 is provided with an outwardly flared conical surface 47 terminating in a short cylindrical section 48 extending to one side of hexagonal section 49. Stud 42 also includes very thin cylindrical shoulder 52 at the end of extension 50 remote from the free end thereof. The free end of axial extension 50 is provided with an axial bore 51 extending along the axis of stud 42. As will become apparent, bore 51 exists in the configuration shown in FIGURE 3 prior to assembly of stud 42 with other elements.

As seen in FIGURE 5, coil hold-down spring 60 is mounted to stud 42 at the lower end thereof. Spring 60 is a coiled compression member having one end abutting hexagonal section 49 and positioned by shoulder 52 while the other end of spring 60 abuts the outwardly extending flange 62 of inverted cup-shaped retainer 65. The latter is provided with an axial aperture 64 (FIGURE 4A) through which the lower axial extension 50 of stud 42 extends with the free end of extension 50 being expanded by inserting a tool in bore 51 to mount retainer 65 to stud 42. This mounting is such that retainer 65 is free to move upward along the axis of stud 42 from the position shown in FIGURE 5.

The upper portion of stud 42 extends through aligned apertures 71, 72 in contact carrying plates 31, 32, respectively, with shoulder 45 closely fitted in the enlarged section 71a at the lower end of aperture 71. Upper end of aperture 71 is provided with an enlarged section 71b which is hexagonal and receives hexagonal lock nut 74 threadably mounted to the upper end of stud extension 46. Return spring 40 surrounds the central section 44 of stud 42 and is a coiled compression member seated at its upper end in the enlarged portion 72a at the lower end of aperture 72. The lower end of return spring 40 is seated upon the upper surface of hexagonal stud section 49. Section 49 is of non-circular shape to facilitate the rotation of stud 42 by utilizing a wrench during mounting of stud 42 to stationary contact plate 31.

As fully explained in the aforesaid copending application 189,915 contact sub-assembly 30 is mounted to base 11 by means of screws 81 extending through the stationary contact members and received by threaded apertures 82 in certain of the terminal straps mounted to base 11. As clearly seen in FIGURE 1, when contactor 11 is assembled, hold-down spring 40 forces shoulder 62 of retainer 65 against the upper surface 17a of coil assembly 17 with retainer 65 being moved upwardly along the axis of stud 42 with respect to the position illustrated in FIGURE 5. Thus, coil assembly 17 is urged downward into firm seating engagement with the bottom wall defining base cavity 17. It is noted that at this time the lower end of stud extension 50 is spaced from the upper surface 17a of coil assembly 17. Upon energization of coil assembly 17, armature 33 is attracted to yoke 20 causing movable contact carrying plate 32 to move downward bringing movable bridging contacts 39A, 39B, 39C into engagement with their respective cooperating stationary contacts. During the closing operation return or opening springs 40, 41 are compressed and upon deenergization of coil assembly 17 the energy stored in springs 40, 41 is released to operate movable contact carrying plate 32 upward to the position shown in FIGURE 1.

It is noted that since hold-down springs 60 exert forces against fixed portions 49 of studs 42, 43 these forces do not act upon armature 33 or return springs 40, 41. Thus, hold-down springs 60 may be made to exert as large a force as is necessary to maintain coil assembly 17 from moving under normal environmental conditions.

Thus, it is seen that this invention provides a novel and improved hold-down means for the operating coil of an electro-magnetic contactor. This hold-down means consists of springs mounted to studs carrying the opening springs for the contactor with the hold-down and opening springs being mounted in such a way that loading of one or both has no effect upon loading of the other and the force exerted by the hold-down springs does not act against the force exerted by the contact operating magnet.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A contactor, including a base having a cavity, a subassembly removably mounted to said base; said subassembly including cooperating contacts operable between a first position in which they are engaged and a second position in which they are disengaged,
   first and second spring means mounted to said subassembly such that removal of said subassembly from said base removes said first and said second spring means therefrom;
   said first spring means urging said contacts to one of said positions;
   an electro-magnet for operating said contacts to the other of said positions, said electro-magnet including an operating coil means; said coil means being disposed within said cavity in said base;
   said second spring means urging said coil away from said cooperating contacts and into firm seating engagement in said cavity in said base.

2. The contactor as set forth in claim 1 in which said cooperating contacts include fixed contacts and movable contacts and said subassembly includes a first and a second member; said first contacts mounted to said first member and said movable contacts mounted to said second member; said movable contacts engageable with said fixed contacts;
   said first spring means urging said second member away from said base.

3. A contactor as set forth in claim 1 in which loading of said first spring means increases when said electro-magnet is energized and loading of said second spring means remains essentially unchanged whether said electro-magnet is energized or deenergized.

4. A contactor including a base, cooperating contacts mounted to said base and operable between a first position in which they are engaged and a second position in which they are disengaged, first spring means urging said contacts to one of said positions, an electro-magnet for operating said contacts to the other of said positions, said electro-magnet including an operating coil means, a second spring means urging said coil means away from said cooperating contacts into firm seating engagement against said base; energization of said electro-magnet operating said cooperating contacts against a force exerted by said first spring means with loading of said second spring means on said coil means remaining essentially unchanged while said electro-magnet is both energized and deenergized also including stud means mounting both of said spring means, said stud means having abutment means against which both of said spring means are seated with said first and second spring means acting in opposite directions with respect to said abutment means.

5. A contactor as set forth in claim 4 in which the stud means is spaced from said coil means.

6. A contactor including a base, a first member mounted in fixed relation to said base, a second member movable toward and away from said base, fixed contacts mounted to said first member, movable contacts mounted to said second member and engageable with said fixed contacts, first spring means urging said second member away from said base, an electro-magnet for operating said second member toward said base against a force exerted by said first spring means, said electro-magnet including an operating coil means, a second spring means urging said coil means away from said first member into firm seating engagement with said base, stud means secured to said first member, said stud means mounting both of said spring means, said stud means extending toward said coil means but being spaced therefrom.

7. A contactor as set forth in claim 6 in which the stud means provides guidance for said second member in moving toward and away from said base.

8. A contactor as set forth in claim 7 in which the second member is interposed between said base and said first member, said coil assembly including contact means, terminal members mounted to said base in frictional engagement with said contact means, said contact means engaging said terminal members by movement of the former in a direction generally parallel to the direction of movement of said second member by said electromagnet.

References Cited by the Examiner

UNITED STATES PATENTS

| | | | |
|---|---|---|---|
| 2,929,899 | 3/1960 | Filliette | 200—104 |
| 3,054,872 | 9/1962 | Clark et al. | 200—104 |
| 3,179,771 | 4/1965 | McGary | 200—104 |

BERNARD A. GILHEANY, *Primary Examiner.*

J. J. BAKER, *Assistant Examiner.*